(12) United States Patent
Suzuki (10) Patent No.: US 7,532,245 B2
(45) Date of Patent: *May 12, 2009

(54) DIGITAL PRINTER AND DIGITAL CAMERA

(75) Inventor: Takeshi Suzuki, Tokyo (JP)

(73) Assignee: Olympus Corporation (JP)

( * ) Notice: Subject to any disclaimer, the term of this patent is extended or adjusted under 35 U.S.C. 154(b) by 511 days.

This patent is subject to a terminal disclaimer.

(21) Appl. No.: 11/356,624

(22) Filed: Feb. 17, 2006

(65) Prior Publication Data

US 2006/0139455 A1 Jun. 29, 2006

Related U.S. Application Data

(63) Continuation of application No. 09/670,464, filed on Sep. 26, 2000, now Pat. No. 7,019,779.

(30) Foreign Application Priority Data

Sep. 28, 1999 (JP) .................................. 11-274505

(51) Int. Cl.
*H04N 5/222* (2006.01)
*H04N 5/76* (2006.01)
*G06K 9/32* (2006.01)

(52) U.S. Cl. ............... 348/333.02; 348/231.5; 348/375; 382/297

(58) Field of Classification Search ............ 348/333.02, 348/231.5, 375, 231.3, 333.01, 333.04, 333.11, 348/333.12, 376, 373, 207.2; 382/297, 244, 382/245, 286, 295, 296

See application file for complete search history.

(56) References Cited

U.S. PATENT DOCUMENTS 4,745,560 A 5/1988 Decker et al. .............. 358/1.11

(Continued)

FOREIGN PATENT DOCUMENTS

JP 08-079497 3/1996

(Continued)

OTHER PUBLICATIONS

Japanese Office Action against application No. 274505/99 dated Dec. 10, 2002.

(Continued)

*Primary Examiner*—John M Villecco
(74) *Attorney, Agent, or Firm*—Ostrolenk, Faber, Gerb & Soffen, LLP (57) ABSTRACT

A system controller 115 has a function of changing the position and the orientation of character data to be superimposed on the image data, in accordance with the operation of one of orientation keys. Specifically, when a downward key has been pushed, the character data is superimposed on a lower portion of the image data, not revolved and but oriented upward. When a rightward key has been pushed, the character data is revolved counterclockwise through 90 degrees, and is located along the right-hand edge of the image data, oriented leftward. When an upward key has been pushed, the character data is revolved through 180 degrees, and is located along the upper edge of the image data, oriented downward. Further, when a leftward key has been pushed, the character data is revolved clockwise through 90 degrees, and is located along the left-hand edge of the image data, oriented rightward. When synthesizing attendant information such as character data with image data and printing the resultant data, the position and the orientation of the attendant information can be efficiently set by a simple operation.

14 Claims, 7 Drawing Sheets

U.S. PATENT DOCUMENTS

| | | | |
|---|---|---|---|
| 4,995,089 A | 2/1991 | Altrieth, III | 382/297 |
| 5,434,960 A | 7/1995 | Suzuki | 715/523 |
| 6,275,260 B1 | 8/2001 | Anderson | 348/239 |
| 6,462,778 B1 * | 10/2002 | Abram et al. | 348/333.02 |
| 6,483,540 B1 | 11/2002 | Akasawa et al. | 348/239 |
| 6,504,999 B2 * | 1/2003 | Sasaki et al. | 348/207.2 |
| 6,512,856 B1 | 1/2003 | Davis | 382/284 |
| 6,532,039 B2 | 3/2003 | Anderson | 348/231.3 |
| 6,597,817 B1 | 7/2003 | Silverbrook | 382/289 |
| 6,963,359 B1 * | 11/2005 | Aosaki et al. | 348/207.2 |
| 2002/0118377 A1 | 8/2002 | Hirumi et al. | 358/1.7 |

FOREIGN PATENT DOCUMENTS

| | | |
|---|---|---|
| JP | 9-322102 | 12/1997 |
| JP | 10-93913 | 4/1998 |

OTHER PUBLICATIONS

English translation of Japanese Office Action against application No. 274505/99 dated Dec. 10, 2002.

* cited by examiner

DIGITAL PRINTER AND DIGITAL CAMERA

CROSS-REFERENCE TO RELATED APPLICATIONS

This application is a continuation of U.S. application Ser. No. 09/670,464, which is based upon and claims the benefit of priority from the prior Japanese Patent Application No. 11-274505, filed Sep. 28, 1999, the entire contents of which are incorporated herein by reference.

BACKGROUND OF THE INVENTION

This invention relates to a digital printer and a digital camera, and more particularly to a digital printer and a digital camera, which can print image with attendant circumstances such as a photography date attached thereto.

Various types of digital video printers for printing photographed images that are obtained by a digital device such as a digital camera have recently been developed. In these printers, photographed images stored in a memory device, for example, a memory card can easily be printed.

Further, there is a recent demand for developing a digital camera provided with a printing mechanism, or a portable printer, which enables printing of a photographed image immediately after photographing it.

A technique is well known, which is for simultaneously recording image data and information such as a photography date, and printing the image data and the photography date superimposed thereon. For example, Japanese Patent Application KOKAI Publication No. 9-322102 discloses an apparatus in which, when printing a photograph with character data such as a date superimposed thereon, the position or the color of the date can be selected by operating a mouse.

In the above described publication, however, the orientation of character data relative to image data is fixed. In other words, the user cannot select the orientation of character data when printing image data together with the character data. In general, this does not cause any problem when printing data obtained by operating the digital camera held in a landscape position. However, in the case of data obtained by operating the camera held in a portrait position, the orientation of character data does not correspond to that of image data, which makes it difficult to read the character data.

BRIEF SUMMARY OF THE INVENTION

It is the object of the invention to provide a digital printer and a digital camera, which can provide a printing output with easy-to-read attendant information such as date information, which have a nice or good format.

To attain the object, there is provided a printer for printing an image based on image data and attendant information associated with the image data, comprising:

means for synthesizing the image data with the attendant information to produce print image data;

means for printing an image based on the print image data; and means for changing an orientation of attendant information to be superimposed on the image, to one of a plurality of predetermined orientations, the changing means changing the orientation of the attendant information in accordance with a predetermined operation by a user so that the attendant information is synthesized with the image, oriented appropriately for an orientation of the image data.

Since the printer can change, to one of a plurality of predetermined orientations, the orientation of the attendant information to be superimposed on the image data, the orientation of the attendant information can be easily made to correspond to the orientation of the image data by appropriately changing the orientation of the attendant information in accordance with the user's operation, for example, between the case of printing image data obtained by operating a digital camera held in a landscape position, and the case of printing image data obtained by operating a digital camera held in a portrait position. Accordingly, the user can easily read the attendant information, and obtain a printing output that looks nice.

Moreover, According to the present invention, the orientation of the attendant information with respect to the image data is predetermined in accordance with a position on the image data, in which the attendant information is superimposed, and the changing means simultaneously changes the position and the orientation of the attendant information to be superimposed on the image data, in accordance with the user's operation of designating the position of the attendant information.

Thus relating the position of the attendant information to its orientation enables printing of the attendant information oriented appropriately for a position designated by the user. As a result, the user does not need to designate the position and the orientation of the attendant information individually. This means that the present invention has a high operability.

The processing of changing the orientation in accordance with the position can be realized by providing an operation unit including four operation sections corresponding to upward, downward, leftward and rightward, thereby setting, in accordance with a user's operation of the orientation unit, the position of the attendant information on the image data along one of upper, lower, left and right edges of the image data, and changing the orientation of the attendant information in accordance with the set position. In this case, the user can set the position and the orientation of the attendant information simply by operating one of orientation keys.

In addition, where the attendant information is situated, for example, along the lower edge of the image data, it can easily be shifted between the left end, the center, and the right end of the lower edge, using means for shifting the position of the attendant information along the one of the upper, lower, left and right edges in accordance with the user's operation of that one of the four operation sections, which corresponds to the one of the upper, lower, left and right edges. This means further enhances the operability of the present invention.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A digital camera according to the embodiment of the invention will be described with reference to the accompanying drawings.

Figure 1A:
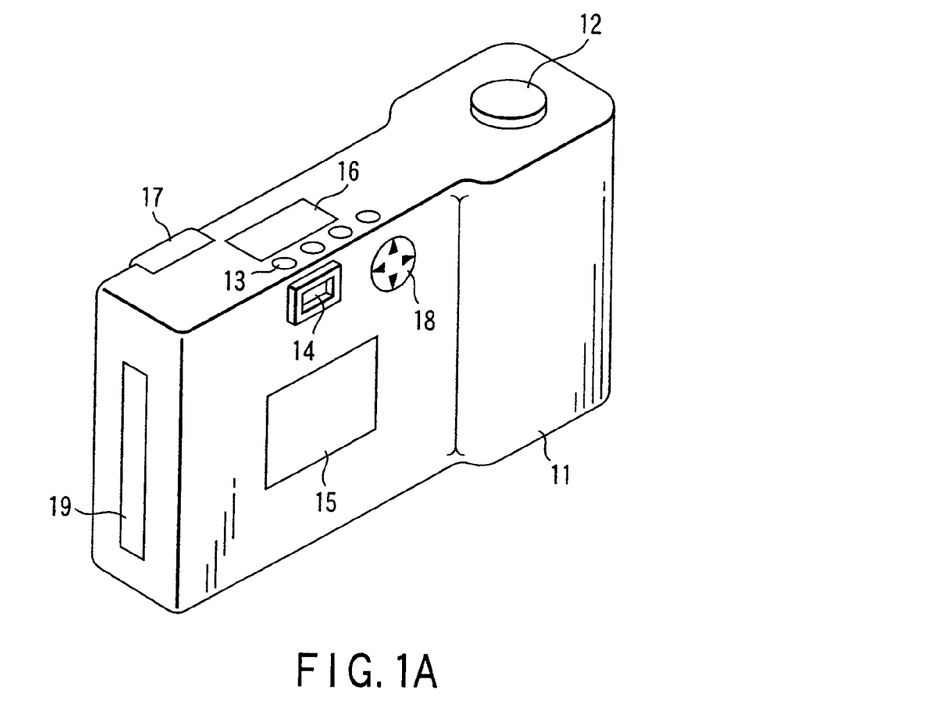
FIG. 1A is a schematic perspective view illustrating an external appearance of a digital camera according to the embodiment of the invention.
Figure 1B:
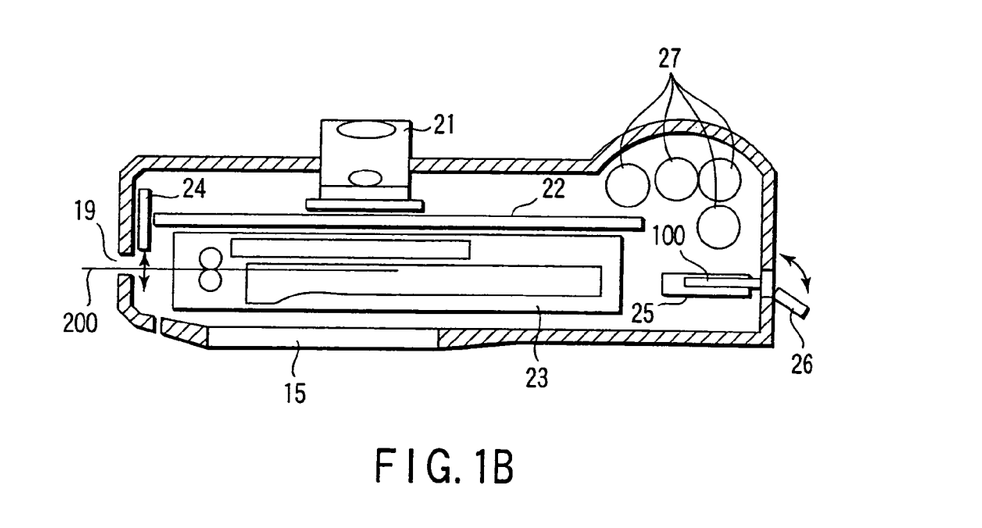
FIG. 1B is a schematic sectional view showing the internal structure of the camera.

Referring first to FIGS. 1A and 1B, the basic structure of the digital camera according to the embodiment will be described.

FIGS. 1A and 1B shows a digital still camera 11 provided with a photosensitive printer. In this camera, an image of an object to be photographed is formed on a solid-state photography element such as a CCD, is converted to image data indicating the photographed image, and is recorded on a recording medium such as a memory card. The image data can be read from the recording medium and a print image can printed out based on the image by the printer. When printing data, character or mark, such as a photography date, associated with image data can be superimposed on the print image.

FIG. 1A is a schematic perspective view of an external appearance of the digital camera 11 when viewed from behind. As is shown in FIG. 1A, the main body of the digital camera 11 is provided with a release switch, i.e. a shutter button 12, a mode switch 13, an optical viewfinder 14, an image display LCD 15, a mode display LCD 16, a strobe light 17, a cross key 18, a sheet discharge port 19, etc.

The release switch or shutter button 12 is an operation button for inputting an instruction to execute photography. The mode switch 13 is an operation button to be used to set/change the operation mode of the digital camera 11. The following three operation modes are prepared for the digital camera 11 and can be switched by the operation of the mode switch 13.

1) Record/Photography Mode:

In this mode, a to-be-photographed subject or object is photographed using a solid-state photography element such as a CCD, and image data obtained by the photography is recorded in a recording medium.

2) Reproduction Mode:

In this mode, data such as image data previously obtained by photography (including image data obtained by photography operation of another digital camera, image data created by a computer, etc.) is read from the recording medium and displayed on the image display LCD 15.

3) Print Mode:

In this mode, data such as image data previously obtained by photography (including data on an image photographed by another digital camera, image data created by a computer, etc.) is read from the recording medium, and an image based on the image data is printed by the built-in printer. An image based on image data obtained by photography can be printed immediately after the photography.

In the print mode, the user can select the contents of character data to be superimposed on a to-be-printed image, and designate the position of the character data on the to-be-printed image by operating the cross key 18. More specifically, the cross key 18 is an operation button for changing the position of character data, and includes four scroll keys as shown. The position of character data is set upward when pushing the upward key, and set downward when pushing the downward key. Further, the orientation of character data is also set with the four scroll keys. The orientation of character data is set downward when pushing the upward key, and set upward when pushing the downward key.

The coordination of the position and orientation of character data enables printing of character data while orienting the character data optimally with respect to its position designated by the user. Thus, the user does not have to designate the position and the orientation individually, which means that the camera has a high operability.

FIG. 1B is a schematic sectional view of the digital camera 11 when viewed from upward.

As shown in FIG. 1B, the digital camera 11 has a photography lens section 21 on the front side of the main body, and contains, in the main body, a printed circuit board 22 provided with various electronic elements, and a printing section 23. The printing section 23 functions as a photosensitive built-in printer, and comprises a film cartridge, an optical head, etc. as shown in FIG. 1B. This photosensitive built-in printer uses a self-development type photosensitive paper (a photosensitive film) as printing paper. The photosensitive paper (film) is exposed on the basis of image data to be printed, and then executes self-development, thereby forming an image thereon.

The film cartridge (also called a "film pack") contains a plurality of photosensitive paper sheets (photosensitive films) used as printing paper sheets. This film cartridge is of a detachable type and can be detachably attached to the main body of the digital camera 11, and printing paper 200 (photosensitive paper) is supplied in units of one film cartridge.

When printing, printing paper sheets 200 (photosensitive paper sheets) are picked up one by one from the film cartridge by means of a conveyance mechanism incorporated in the printing section 23, and sequentially exposed to light by the optical head section while they are conveyed toward the paper discharge port 19. Each exposed printing paper sheet 200 is pressed by rollers for conveyance, whereby a developer contained in each printing paper sheet 200 is spread all over the to-be-developed surface. After that, each paper sheet 200 is discharged through the paper discharge port 19.

The paper discharge port 19 has a paper discharge port shutter 24. When printing is not executed, the paper discharge port shutter 24 is closed to prevent the entrance of dust from the outside.

Further, as shown in FIG. 1B, the main body of the digital camera 11 also includes a card slot 25 for inserting therein an attachable/detachable memory 100 formed of an attachable/detachable nonvolatile recording medium such as a memory card, a card lid 26 for protecting the attached memory 100, and a battery box for containing a plurality of batteries 27 used as the power supply of the digital camera 11.

(System Structure)

Figure 2:
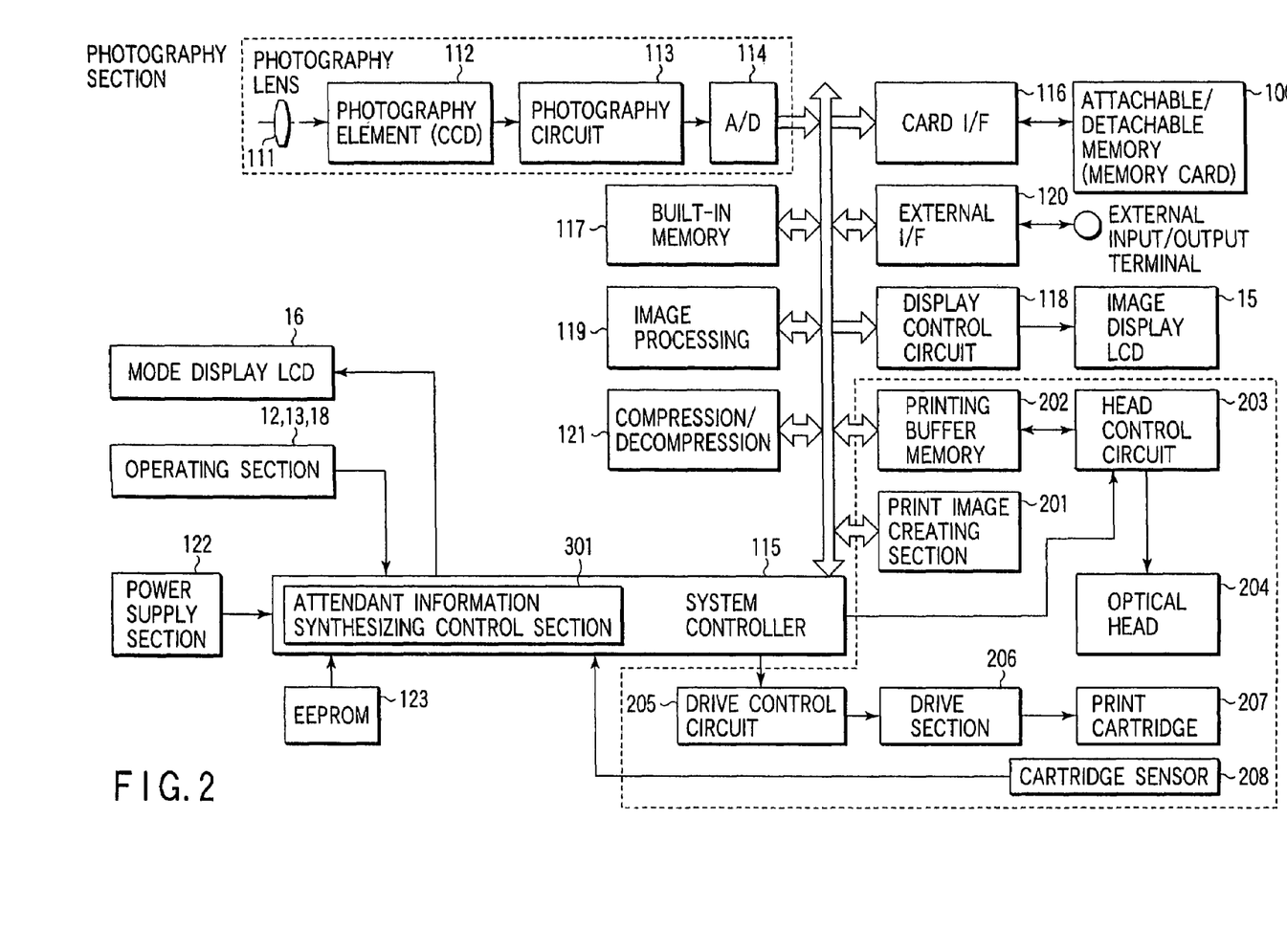
FIG. 2 is a block diagram illustrating the system of the digital camera shown in FIGS. 1A and 1B.

Referring then to FIG. 2, the system of the digital camera 11 will be described.

In addition to an operation section including the shutter button 12, the mode switch 13 and the cross key 18, the image display LCD 15, the mode display LCD 16 and the strobe light 17, the digital camera 11 comprises a photography lens system 111, a photography element 112, a photography circuit 113, an A/D converting circuit 114, a system controller 115, a memory card interface (I/F) 116, a built-in memory 117, a display control circuit 118, an image processing section 119, an external interface (I/F) 120, an compression/decompression processing section 121, a power supply section 122, an EEPROM 123, etc.

The photography lens system 111, the photography element 112, the photography circuit 113 and the A/D converter circuit 114 constitute a photography section. The photography lens system 111 is an optical system that constitutes the photography lens section 21. The photography element 112 is a solid-type photography element for executing photoelectric conversion to convert a subject image, formed by the photography optical system 111, into an electric image signal. This element is formed of, for example, a CCD area sensor provided with a color filter.

The photography circuit 113 controls the photography element 112 so as to receive image information from the element 112, to adjust the speed of the element shutter (electronic shutter) of the element 112, and/or to adjust the gain of an image signal output from the element 112. An image signal output from the photography circuit 113 is supplied to the A/D converter circuit 114, where it is converted into a digital image signal.

The system controller 115 is a CPU for controlling each unit incorporated in the digital camera 11, and is formed of, for example, a one-chip microcomputer. In this embodiment, the system controller 115 has an attendant information synthesizing/controlling section 301 for controlling the process of synthesizing character data, as well as a control section for photographing, recording and printing an image. The attendant information synthesizing/controlling section 301 has an attendant information synthesizing/controlling section 301 for simultaneously changing the position and the orientation of character data associated with image data. This attendant information synthesizing/controlling section 301 will be described later in detail with reference to FIGS. 5 to 7.

The memory card interface (I/F) 116 is provided for accessing the attachable/detachable memory 100 to read/write data. Image data is written into and read from the memory 100 via the memory card interface (I/F) 116.

The built-in memory 117 is a buffer area used for temporarily holding photography image data obtained by the photography section. This buffer area is also used as a working area for image processing. The image processing section 119 creates image data for printing by superimposing character data associated with image data on the image data. This synthesizing processing by the image processing section 119 or the compression/decompression processing by the compression/decompression processing section 121 are executed on the built-in memory 117.

The display control circuit 118 has a function of displaying image data on the image display LCD 15, and displays an original image or character data on a display section under the control of the system controller 115 when executing the character data designating processing. The external interface 120 is provided for enabling communication with an external computer or other electron devices via a communication interface such as RS232, IEEE1394, etc. The external interface 120 transmits or receives various control data items, image data, etc.

The compression/decompression processing section 121 compresses to-be-recorded image data obtained by photography in a compression format such as JPEG (Joint Photographic Coding Experts Group), and decompresses to-be-printed (or to-be-reproduced) compressed image data read from the attachable/detachable memory 100.

The power supply section 122 is a power supply circuit for supplying each unit of the digital camera 11 with operation power output from the batteries contained in the digital camera 11 or from an external AC power supply. The EEPROM 123 stores, for example, parameters for various image processing steps.

The digital camera 11 also includes, as units constituting the printing section 23, a to-be-printed image creating section 201, a printing buffer memory 202, a head driving circuit 203, an optical head section 204, a drive control circuit 205, a driving section 206, a film cartridge 207, a cartridge sensor 208, etc., as is shown in FIG. 2.

The to-be-printed image creating section 201 executes various types of image processing, such as resizing processing, gamma correction processing, color correction processing, etc., on to-be-printed image data stored in the built-in memory 117 for obtaining image data suitable for printing. The section 201 rasterizes the image data for printing, and develops it in units of one line in the printing buffer memory 202. The image data developed in the printing buffer memory 202 is supplied to the optical head section 204 via the head driving circuit 203. The optical head section 204 is formed of three optical heads corresponding to light beams R, G and B, and an LCD shutter for controlling, in units of one pixel, interruption/transmission of light emitted from the optical heads. The control of the open period of the LCD shutter enables setting of a period of exposure to each light beam R, G or B in units of one pixel. The cartridge sensor 208 detects whether or not the film cartridge 207 is mounted.

(Print Mode)

Figure 3:
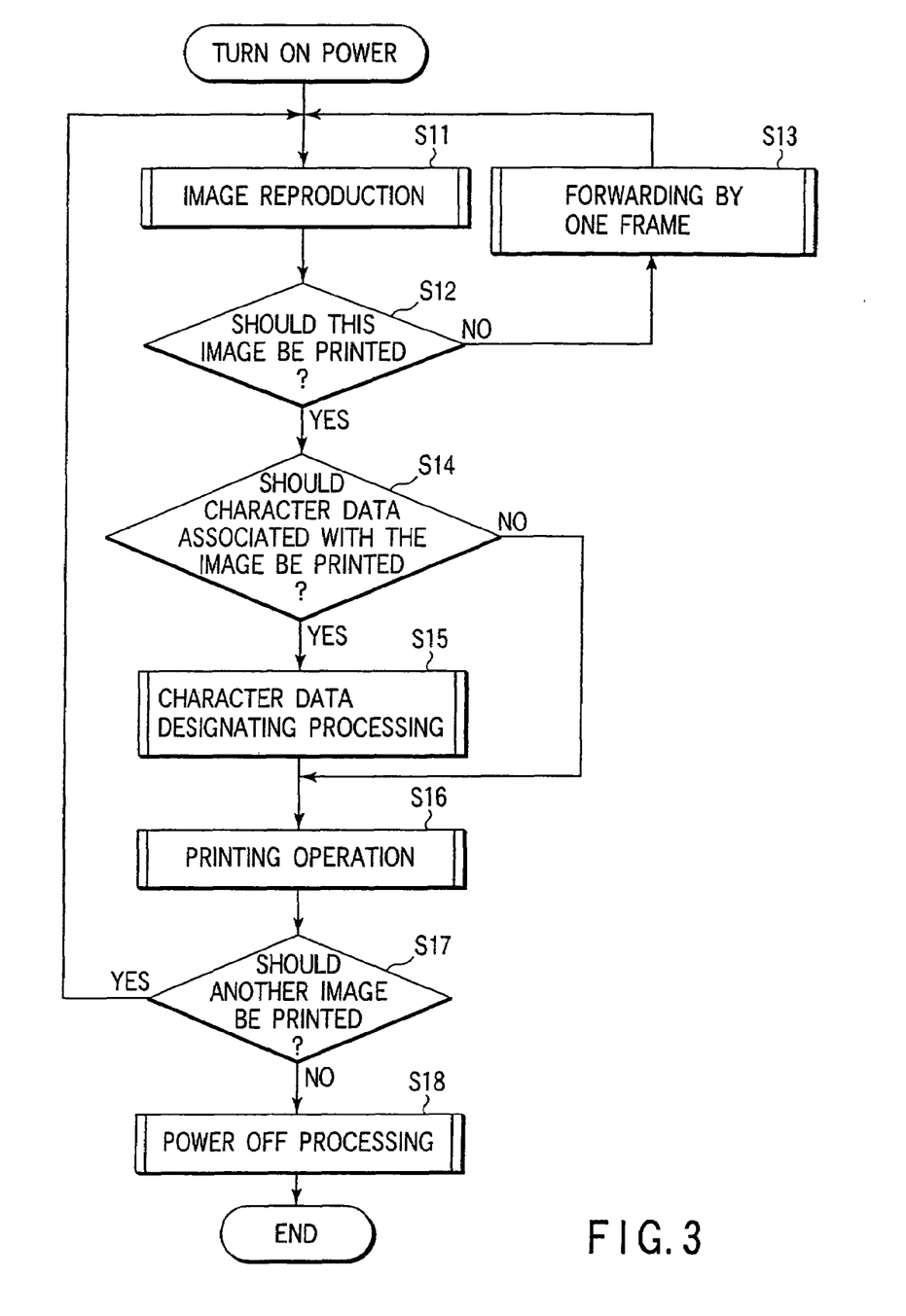
FIG. 3 is a flowchart useful in explaining the flow of processing executed by the digital camera system when it is in a print mode.

Referring now to the flowchart of FIG. 3, a series of operations executed in the print mode will be described. In this section, a description will be given of a case where image data previously photographed and recorded in the attachable/detachable memory 100 is printed.

Figure 4:
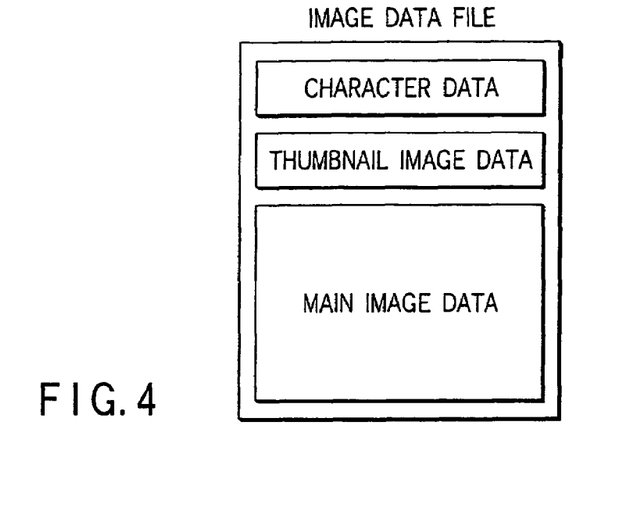
FIG. 4 is a view illustrating an example of a file structure of image data recorded in a recording medium incorporated in the digital camera system shown in FIG. 2.

When the user has designated the print mode, the system controller 115 reads an image data file from the attachable/detachable memory 100, then controls the compression/decompression processing section 121 so as to decompress main image data contained in the image data file, and displays the decompressed data on the image display LCD 15 (step S11). The image data file includes main image data, thumbnail image data and character data such as a photography date, a file name, etc. as shown in FIG. 4.

When printing an image other than the displayed image (if the answer to the question of a step S12 is NO), frame feeding for reading another image from the attachable/detachable memory 100 is executed in accordance with the user's operation (step S13), thereby repeating the processing of the step S11.

After a to-be-printed image is selected (if the answer to the question of the step S12 is YES), the system controller 115 inquires the user, by displaying, for example, a message on the image display LCD 15, whether or not character data associated with the image should be printed together with the image (step S14).

Figure 5:
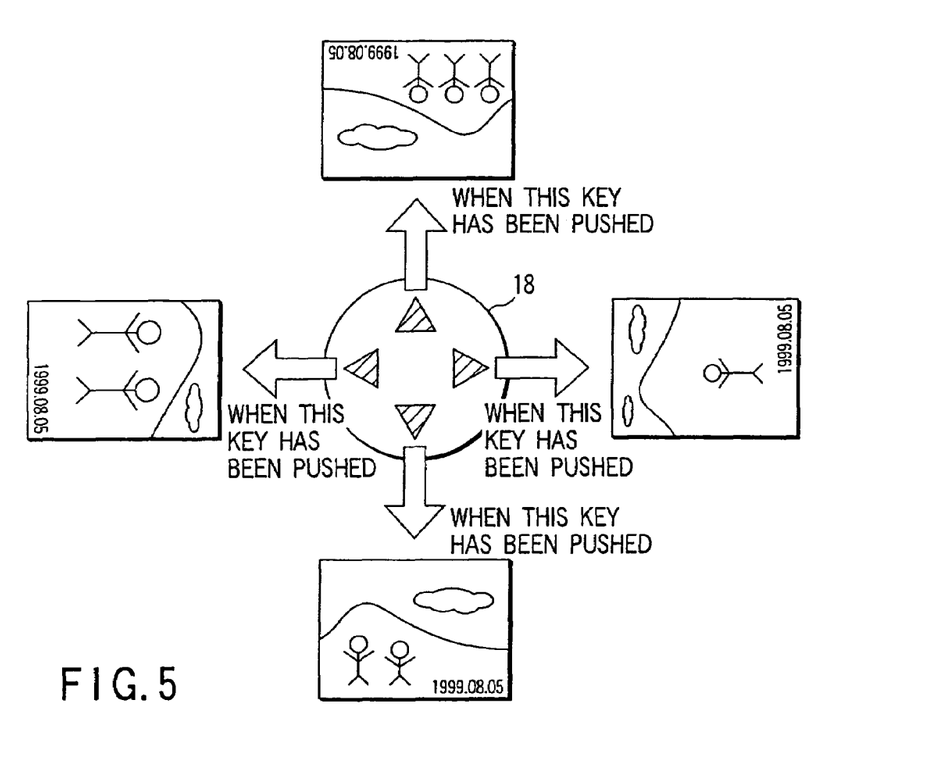
FIG. 5 is a view useful in explaining processing for designating character data, executed by the key operation of the digital camera shown in FIGS. 1A and 1B.

If the user designates the printing of the character data (if the answer to the question of the step S14 is YES), the system controller 115 executes character data designating processing (step S15), in which to-be-printed character data is selected, and the position and the orientation of the character data in the to-be-printed image are set. FIG. 5 shows manners of setting of the position and the orientation of character data.

As is shown in FIG. 5, character data such as a photography date is placed in a lower portion of the image and oriented upward, when the downward key included in the cross key 18 has been pushed. Accordingly, image data obtained by the digital camera 11 held in the landscape position is oriented upward as shown in FIG. 5, i.e. displayed in a correct position. Thus, when printing this image data, character data can be set in an appropriate position and oriented appropriately simply by pushing the downward key.

On the other hand, when the user has pushed the rightward key of the cross key 18, character data such as a photography date is placed on the right hand of an image and oriented leftward. Similarly, when the user has pushed the leftward key of the cross key 18, character data date is placed on the left hand of an image and oriented rightward.

Image data obtained by operating the digital camera held in the portrait position is displayed on the screen such that it is orientated leftward or rightward. Therefore, when printing this image data, character data can be set in an appropriate position and oriented appropriately with respect to the orientation of the image data, by pushing the rightward or leftward key.

Further, when the user has pushed the upward key of the cross key 18, character data such as a photography date is placed in an upper portion of the image and orientated downward as shown in FIG. 5. Accordingly, in the case of printing, for example, image data obtained by operating the digital camera held upside down, i.e. printing image data in a landscape position and upside down state, character data can be set in an appropriate position and oriented appropriately simply by pushing the upward key.

As described above, the relationship between the position and the orientation of character data is predetermined so that the character data will be always placed in a lower portion of image data irrespective of the orientation of the image data, and therefore the position and the orientation of the character data can be set simultaneously simply by operating the cross key 18. It is a matter of course that the relationship between the position and the orientation of character data may be predetermined so that the character data will be always placed in an upper portion of image data irrespective of the orientation of the image data.

After the position and the orientation of character data is determined on the LCD screen by character data designating processing, the system controller 115 executes, using the image processing section 119, image processing for obtaining image data for printing with character data superimposed thereon, thereby starting printing processing and outputting an image from the printer section (step S16). The output image is basically identical to a displayed one. Accordingly, the operation of the cross key 18 is also an operation for designating on which portion of the printing paper sheet 200 the character data is printed.

When the user has input an instruction to print another image (step S17), the system controller 115 re-executes the processing at the step S11, et seq. When the user has input an instruction to finish the printing (if the answer to the question of the step S17 is NO), the system controller 115 executes power-off processing (step S18), thereby finishing the processing.

(Character Data Designating Processing)

Figure 6A:
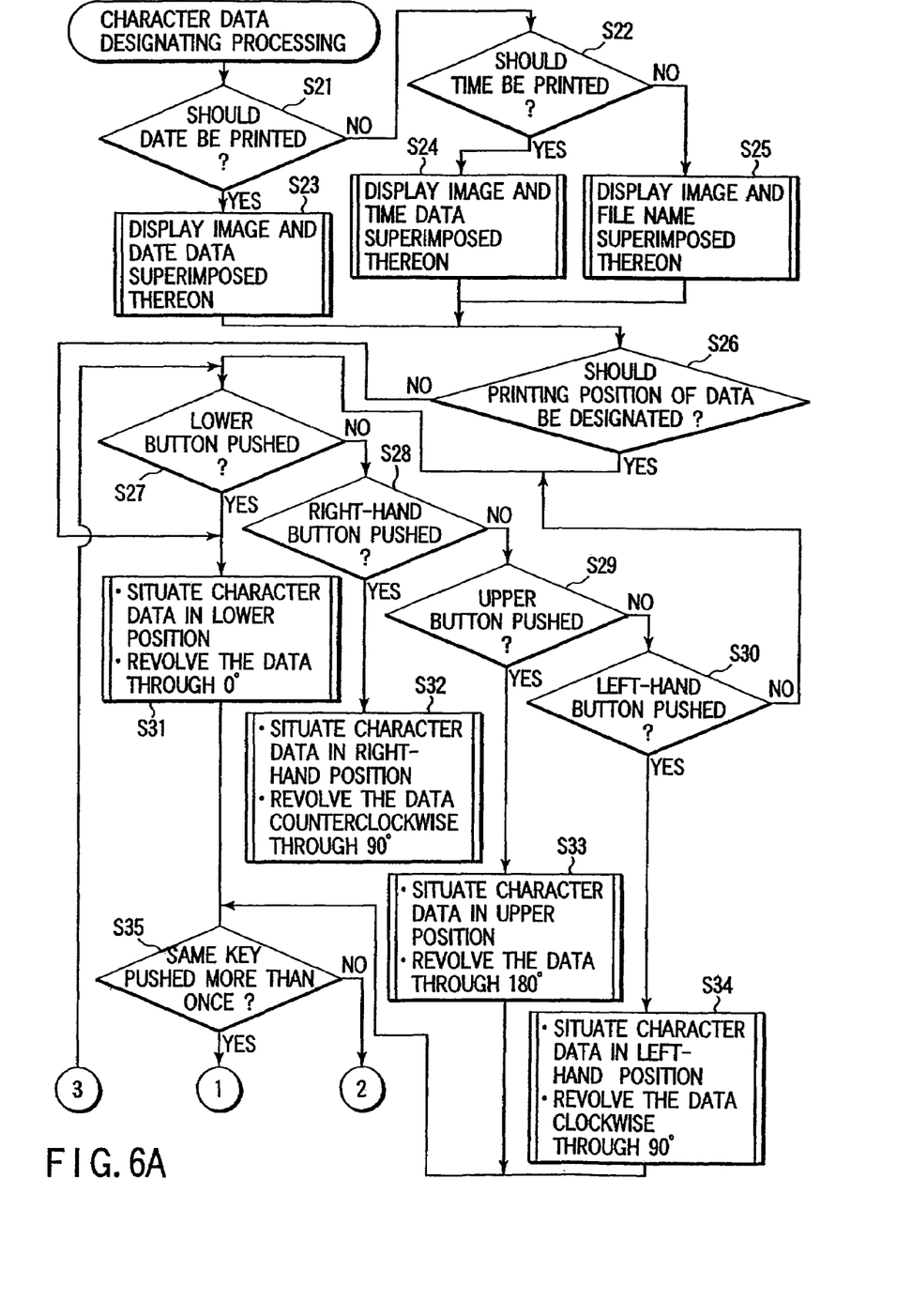
FIGS. 6A and 6B are flowcharts useful in explaining the procedure of the processing for designating character data, executed by the key operation in the digital camera system shown in FIG. 2.
Figure 6B:
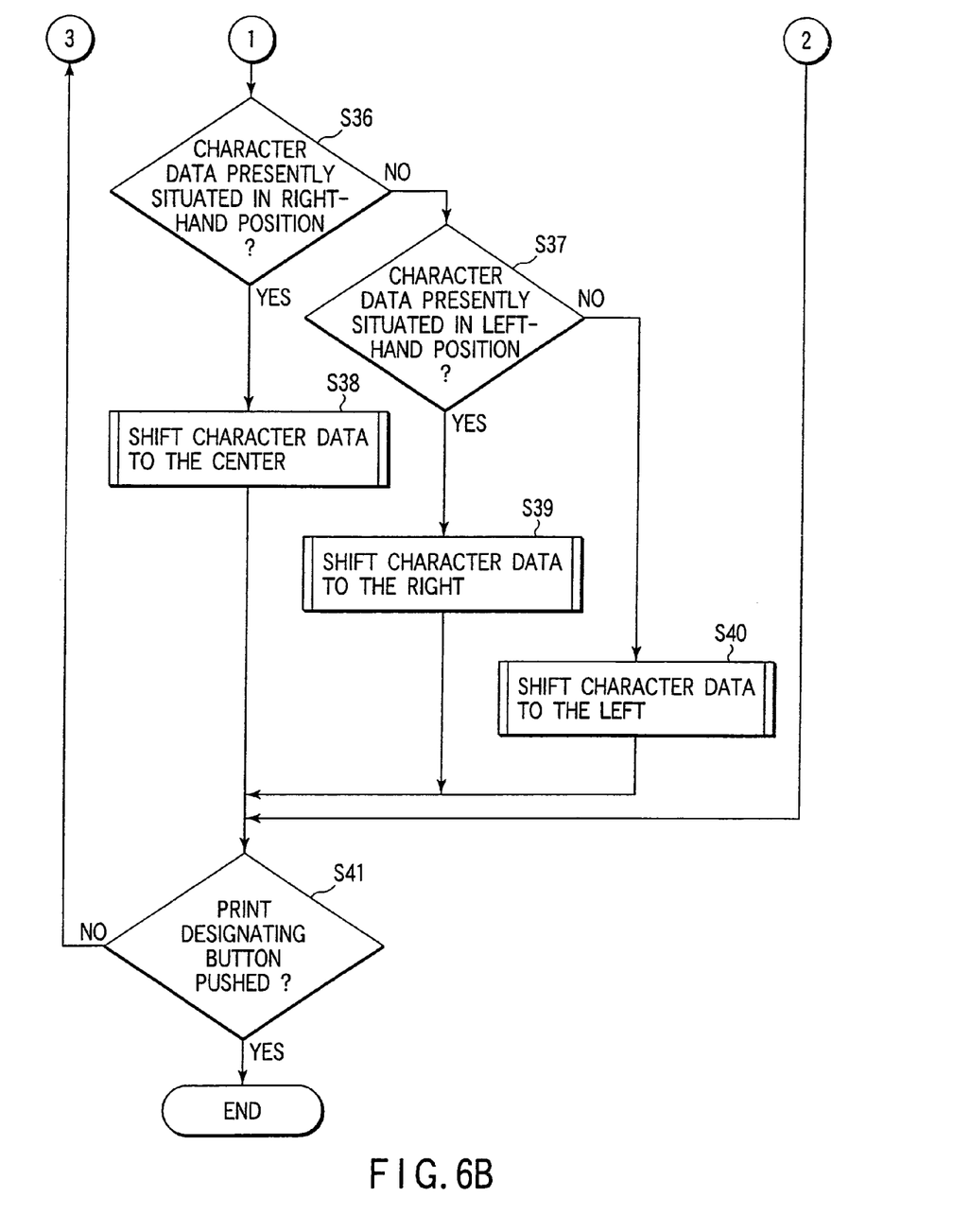

Referring now to the flowchart of FIGS. 6A and 6B, the procedure of processing for designating character data, executed at the step S15 of FIG. 3, will be described in detail.

In the character data designating processing, the system controller 115 first determines, on the basis of the operation by the user, that any of date, time and file name should be printed, and then displays an image with date, time or file name data superimposed thereon (steps S21-S25). The initial position of the date, time or file name data is a lower portion of the displayed image, and the orientation of the character data is set upward as usual.

After that, the system controller 115 determines whether or not the printing position of the character data should be designated, on the basis of whether or not the cross key 18 has been operated (step S26). If no orientation key of the cross key 18 is operated (if the answer to the question of the step S26 is NO), or if the downward key (lower button) of the cross key 18 is pushed, the system controller 115 situates the character data along the lower edge of the image without revolving it, i.e. keeping it oriented upward (in a default state) (step S31).

When the user has pushed the rightward key (right-hand button) (if the answer to the question of a step S28 is YES), the system controller 115 situates the character data along the right-hand edge of the image, orienting it leftward by revolving the character data counterclockwise through 90 degrees (step S32).

When the user has pushed the upward key (upper button) (if the answer to the question of a step S29 is YES), the system controller 115 situates the character data along the upper edge of the image, orienting it downward by revolving the character data counterclockwise or clockwise through 180 degrees (step S33).

When the user has pushed the leftward key (left-hand button) (if the answer to the question of a step S30 is YES), the system controller 115 situates the character data along the left edge of the image, orienting it rightward by revolving the character data clockwise through 90 degrees (step S34).

Subsequently, the system controller 115 detects whether or not the user has pushed the same orientation key more than once (step S35). If the same orientation key has been pushed more than once (if the answer to the question of the step S35 is YES), the system controller 115 cyclically shifts the position of the character data, along an edge indicated by the orientation key, to "central position", "left end position", "right end position", and again "central position", "left end position" in this order each time the orientation key has been pushed once (steps S36-S40), as is shown in FIG. 7.

Figure 7:
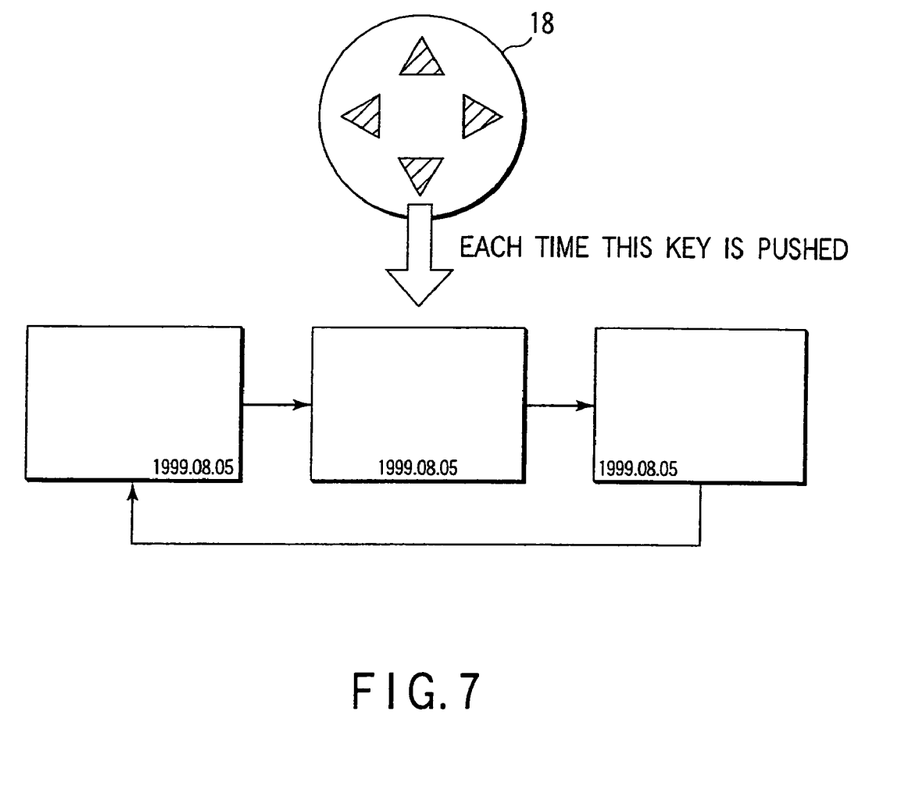
FIG. 7 is a schematic view useful in explaining the procedure of processing for moving character data, included in the character data designating processing and executed by the key operation in the digital camera system shown in FIG. 2.

FIG. 7 shows a case where the downward key has been pushed several times. When the downward key has been pushed for the first time, the character data is initially situated in "right end position" along the lower edge of the image. If, in this state, the downward key is pushed again, the character data is shifted to "central position" along the lower edge of the image. If the downward key is again pushed, the character data is further shifted to "left end position". Similarly, if the downward key is yet again pushed, the character data is returned to "right end position".

More specifically, in the shifting processing, the system controller 115 first determines whether or not the present position of the character data is "right end position" along the edge indicated by the presently pushed orientation key (step S36). If it is determined to be "right end position" (if the answer to the question of the step S36 is YES), the position of the character data is shifted to "central position" (step S38).

On the other hand, if the present position of the character data is not "right end position" along the edge indicated by the presently pushed orientation key, it is determined whether or not the present position of the character data is "left end position" (step S37). If it is determined to be "left end position" (if the answer to the question of the step S37 is YES), the position of the character data is shifted to "right end position" (step S39). If, on the other hand, the present position of the character data is not "left end position" (i.e. if the answer to the question to the step S37 is NO and it is determined to be "central position"), the system controller 115 shifts the character data to "left end position" (step S40).

The above-described processing of controlling the position and orientation of character data by operating the orientation keys, and the processing of shifting character data by continuously operating the same orientation key are repeated until the user inputs an instruction to execute printing (if the answer to the question of a step S41 is NO).

As described above, since, in the embodiment, the orientation of character data to be superimposed on image data can be shifted to one of predetermined upward, downward, leftward and rightward orientations in accordance with button operations by the user. Accordingly, character data can easily be superimposed on to-be-printed image data, oriented appropriately for the image data. In particular, relating the position of character data to its orientation enables superimposition and printing of character data in a position on image data, designated by the user, in a state in which the character data is oriented optimally with respect to the designated position. Thus, the digital camera has a high operability. Further, the position of character data can be shifted along an edge indicated by a presently pushed orientation key, by pushing the orientation key more than once. As a result, adjustment of the position of the character data can be executed easily.

Although in the embodiment, character data is used as attendant information to be superimposed on to-be-printed image data, the same processing can be executed even when synthesizing image data with a figure or a mark prepared in advance and printing the resultant data. Moreover, the processing may be modified such that at first, only the orientation of character data is changed by a predetermined button operation by the user, and the position of the character data is changed later, if necessary, by a predetermined button operation by the user.

In addition, although the control of synthesizing attendant information according to the embodiment is suitable especially for a digital camera that has a printing function, it is also applicable, for example, to a video printer having an attendant information synthesizing function, since the position and orientation of attendant information can be determined efficiently by a simple button operation. A structure obtained by removing the photography section from the digital camera of the embodiment may be used as the video printer.

As described above, the present invention can easily provide a printing output with easy-to-read attendant information, which looks nice.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for printing an image based on image data and attendant information associated with the image data, the method comprising:

synthesizing the image data with the attendant information to produce print image data;

setting an orientation and a position of the attendant information to be superimposed on the image in accordance with a user's operation of an operation unit including four operation sections corresponding to upward, downward, leftward and rightward designations, the position of the attendant information being set along one of upper, lower, left and right edges of the image data in accordance with the user's operation of respective operation sections of the operation unit, and the orientation of the attendant information being appropriately set in accordance with the set position;

shifting the position of the attendant information along the edges of the image in accordance with the operation of the four operation sections; and printing the image based on the print image data.

2. The printing method according to claim 1, wherein the orientation and the position are predetermined in an initial state, and the orientation and the position are reset together with the user's operation.

3. The printing method according to claim 1, wherein the attendant information includes character data.

4. The printing method according to claim 1, wherein the attendant information includes a file name of the image data.

5. The printing method according to claim 1, wherein the orientation and the position are set by the user's operation of one of the four operation sections, and the position is shifted by the user's operation of the one of the four operation sections.

6. An apparatus for printing an image based on image data and attendant information associated with the image data, the apparatus comprising:

means for synthesizing the image data with the attendant information to produce print image data;

means for printing an image based on the print image data;

means for changing an orientation of attendant information to be superimposed on the image, to one of a plurality of predetermined orientations, said changing means changing the orientation of the attendant information in accordance with the image, oriented appropriately for an orientation of the image data;

an operation unit including four operation sections corresponding to upward, downward, leftward and rightward designations, wherein the changing means sets, in accordance with a user's operation of respective operation sections of the operation unit, the position of the attendant information on the image data along one of upper, lower, left and right edges of the image data, and changes the orientation of the attendant information in accordance with the set position;

a slot in which a storage medium storing the image data and the attendant information is inserted;

a display which displays to-be-printed image data;

a sheet ejection portion which ejects a printed sheet; and a plurarlity of electrically connected batteries used as a power source for the apparatus;

wherein the operation unit and the display are arranged on one side of an exterior of the apparatus, and the slot and the sheet ejection portion are arranged in a different position from those of the operation unit and the display and wherein the batteries are positioned within the apparatus at a side of the display distal to the sheet ejection portion, with the batteries being arranged parallel to each other and to the sheet ejection portion.

7. The apparatus according to claim 6, wherein the slot and the sheet ejection portion are arranged on substantially opposite sides on the exterior of the apparatus.

8. The apparatus according to claim 6, wherein the slot and the sheet ejection portion are arranged on a surface substantially orthogonal to a surface in which the display is arranged.

9. An apparatus according to claim 6, wherein the changing means includes means for shifting the position of the attendant information along the one of the upper, lower, left and right edges in accordance with a user's operation of that one of the four operation sections, which corresponds to the one of the upper, lower, left and right edges.

10. An apparatus for printing an image based on image data and attendant information associated with the image data, the apparatus comprising:
   a synthesizer that is structured to synthesize the image data with the attendant information to produce print image data;
   a printer that prints an image based on the print image data;
   a processor that changes an orientation of attendant information to be superimposed on the image, to one of a plurality of predetermined orientations, said processor being capable of changing the orientation of the attendant information in accordance with a predetermined operation by a user so that the attendant information is synthesized with the image, oriented appropriately for an orientation of the image data: and
   an operation unit including four operation sections corresponding to upward, downward, leftward and rightward designations, wherein the processor sets, in accordance with a user's operation of respective operation sections of the operation unit, the position of the attendant information on the image data along one of upper, lower, left and right edges of the image data, and changes the orientation of the attendant information in accordance with the set position;
   a slot in which a storage medium storing the image data and the attendance information is inserted;
   a display which displays to-be-printed image data;
   a sheet ejection portion which ejects a printed sheet; and
   a plurality of electrically connected batteries used as a power source for the apparatus;
   wherein the operation unit and the display are arranged on one side of an exterior of the apparatus, and the slot and the sheet ejection portion are arranged in a different position from those of the operation unit and the display and wherein the batteries are positioned within the apparatus at a side of the display distal to the sheet ejection portion, with the batteries being arranged parallel to eaach other and to the sheet ejection portion.

11. The apparatus according to claim 10, wherein the slot and the sheet ejection portion are arranged on substantially opposite sides on the exterior of the apparatus.

12. The apparatus according to claim 10, wherein the slot and the sheet ejection portion are arranged on a surface substantially orthogonal to a surface in which the display is arranged.

13. An apparatus according to claim 10, wherein the changing means includes means for shifting the position of the attendant information along the one of the upper, lower, left and right edges in accordance with a user's operation of that one of the four operation sections, which corresponds to the one of the upper, lower, left and right edges.

14. An apparatus for printing an image based on image data and attendant information associated with the image data, the apparatus comprising:
   a synthesizer that is structured to synthesize the image data with the attendant information to produce print image data;
   a printer that prints an image based on the print image data;
   a processor that changes an orientation of attendant information to be superimposed on the image, to one of a plurality of predetermined orientations, said procerror being capable of changing the orientation of the attendant information in accordance with a predetermined operation by a user so that the attendant information is synthesized with the image, oriented appropriately for an orientation of the image data: and
   an operation unit including four operation sections corresponding to upward, downward, leftward and rightward designations, wherein the processor sets, in accordance with a user's operation of respective operation sections of the operation unit, the position of the attendant information on the image data along one of the upper, lower, left and right edges of the image data, and changes the orientation of the attendant information in accordance with the set position;
   a slot in which a storage medium storing the image data and the attendant information is inserted;
   a display which displays to-be-printed image data;
   a sheet ejection portion which ejects a printed sheet;
   wherein the operation unit and the dispaly are arranged on one side of an exterior of the apparatus, and the slot and the sheet ejection portion are arranged in a different positon from those of the operation unit and the display.

* * * * *